(12) United States Patent
Ozawa

(10) Patent No.: US 8,964,005 B2
(45) Date of Patent: Feb. 24, 2015

(54) APPARATUS AND METHOD FOR DISPLAYING OBLIQUELY POSITIONED THUMBNAILS ON A 3D IMAGE DISPLAY APPARATUS

(75) Inventor: Masahiro Ozawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 207 days.

(21) Appl. No.: 13/080,538

(22) Filed: Apr. 5, 2011

(65) Prior Publication Data
US 2012/0007961 A1 Jan. 12, 2012

(30) Foreign Application Priority Data
Jul. 8, 2010 (JP) .................. 2010-156137

(51) Int. Cl.
H04N 9/47 (2006.01)
H04N 13/00 (2006.01)

(52) U.S. Cl.
CPC ......... *H04N 13/0022* (2013.01); *H04N 13/004* (2013.01)
USPC ....................................................... 348/51

(58) Field of Classification Search
USPC ........................................................ 348/51
See application file for complete search history.

(56) References Cited

U.S. PATENT DOCUMENTS

| | | | | |
|---|---|---|---|---|
| 7,554,539 | B2 * | 6/2009 | Balfour | 345/419 |
| 2002/0061194 | A1 | 5/2002 | Wu et al. | |
| 2004/0041747 | A1 * | 3/2004 | Uehara et al. | 345/6 |
| 2007/0107769 | A1 * | 5/2007 | Cobb et al. | 136/246 |
| 2008/0258996 | A1 * | 10/2008 | Takayama | 345/1.3 |
| 2008/0291299 | A1 * | 11/2008 | Kano | 348/241 |
| 2010/0189413 | A1 * | 7/2010 | Yoshino | 386/83 |

FOREIGN PATENT DOCUMENTS

| | | |
|---|---|---|
| JP | 2001-236521 | 8/2001 |
| JP | 2002-024850 | 1/2002 |
| JP | 2008-278425 | 11/2008 |

* cited by examiner

*Primary Examiner* — Dave Czekaj
*Assistant Examiner* — Leron Beck
(74) *Attorney, Agent, or Firm* — Blakely, Sokoloff, Taylor & Zafman LLP

(57) ABSTRACT

According to one embodiment, a 3D image output apparatus includes: an oblique display judging module configured to judge whether a thumbnail relating to an image content that can be displayed in 3D is displayed obliquely; and an image signal output module configured to: output an image signal relating to a thumbnail so that the thumbnail is displayed in 2D when the oblique display judging module judges that the thumbnail is displayed obliquely; and output an image signal relating to the thumbnail so that the thumbnail is displayed in 3D when the oblique display judging module judges that the thumbnail is not displayed obliquely.

18 Claims, 10 Drawing Sheets

CONTENT SELECTION SCREEN
THE LEFT-EYE THUMBNAIL IS OUTPUT FOR THE OBLIQUE IMAGES OF BOTH THE LEFT-EYE OUTPUT IMAGE AND RIGHT-EYE OUTPUT IMAGE. (THE RIGHT-EYE THUMBNAIL CAN ALSO BE OUTPUT FOR THE OBLIQUE IMAGES OF BOTH THE OUTPUT IMAGES.)

SCREEN FOR INSTRUCTING REPRODUCTION OF SELECTED CONTENT
WHEN THE THUMBNAIL OF THE FRONT IMAGE IS SELECTED, IT IS DISPLAYED IN 3D.

FRONT BACKGROUND IMAGE
(GUI)

FRONT THUMBNAIL IMAGE

FRONT OUTPUT IMAGE
(GUI + THUMBNAIL)

OBLIQUE BACKGROUND
IMAGE (GUI)

OBLIQUE THUMBNAIL IMAGE

OBLIQUE OUTPUT IMAGE
(GUI + THUMBNAIL)

APPARATUS AND METHOD FOR DISPLAYING OBLIQUELY POSITIONED THUMBNAILS ON A 3D IMAGE DISPLAY APPARATUS

CROSS REFERENCE TO RELATED APPLICATION(S)

The application is based upon and claims the benefit of priority from Japanese Patent Application No. 2010-156137 filed on Jul. 8, 2010, the entire contents of which are incorporated herein by reference.

BACKGROUND

1. Field

An embodiment according to the present invention relates to a 3D image display apparatus capable of displaying 3D images.

2. Description of the Related Art

In recent years, 3D image display apparatuses capable of displaying 3D (three-dimensional) images are being put into practical use.

Such 3D image display apparatuses receive 3D images formed for 3D image display and then display the 3D images.

In addition, such 3D image display apparatus can display thumbnails relating to image contents.

A thumbnail is herein a reduced-size representation of an image, such as a moving image or a still image. For example, it is possible to select a desired image content from among a plurality of image contents displayed side by side by using a thumbnail. The image content selected by using the thumbnail can be viewed by the user.

In addition, general image display apparatuses are requested to display various images, such as a front image and an image (oblique image) turned obliquely by a predetermined angle from the front image in consideration of screen design and screen space.

Furthermore, a front image representing the front view of an image content, an oblique image representing the view of the image content turned by an angle, etc. are generally used as thumbnails.

Moreover, 3D image display apparatuses are also requested to display thumbnails for image content selection.

BRIEF DESCRIPTION OF THE DRAWINGS

A general configuration that implements the various features of embodiments will be described with reference to the drawings. The drawings and the associated descriptions are provided to illustrate embodiments and not to limit the scope of the embodiments.

DETAILED DESCRIPTION

An embodiment of the present invention will be described below referring to the accompanying drawings.

Figure 1:
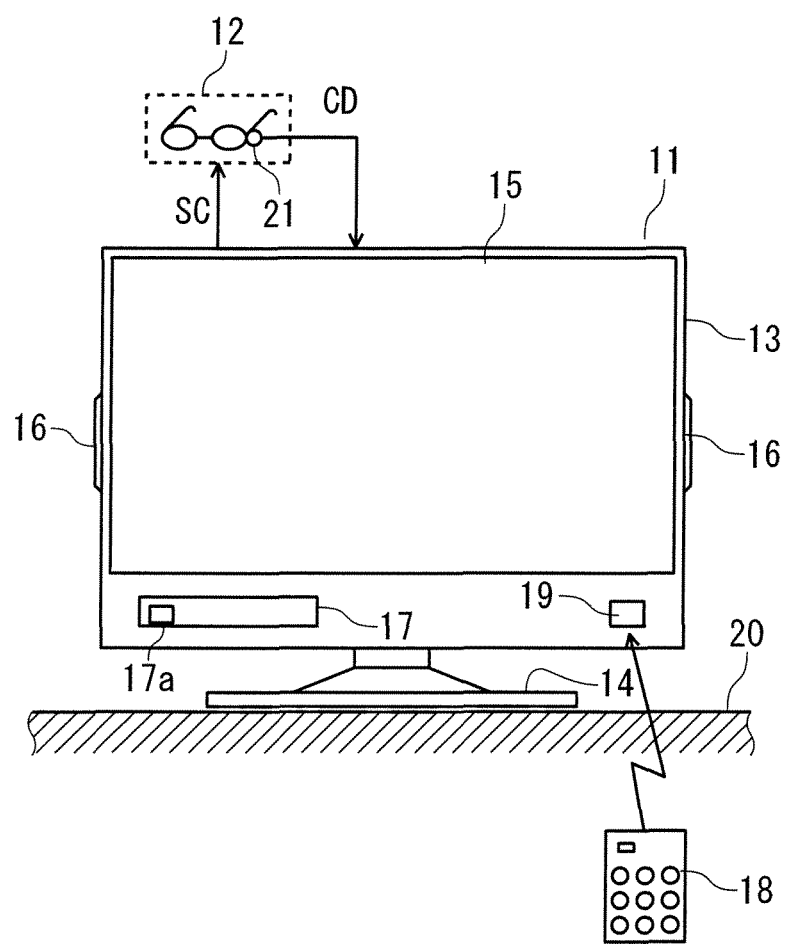
FIG. 1 is a view showing an external appearance of a 3D image output apparatus according to an embodiment.

FIG. 1 is a view showing an external appearance of a 3D image output apparatus according to the embodiment.

Numeral 11 designates a digital television broadcast receiver, numeral 12 designates stereoscopic glasses (3D glasses), numeral 13 designates a cabinet, numeral 14 designates a support base, numeral 15 designates a liquid crystal display panel, numeral 16 designates a speaker, numeral 17 designates an operation module, numeral 17a designates a main power switch, numeral 18 designates a remote controller, numeral 19 designates a light-receiving module, numeral 20 designates a base, and numeral 21 designates a glass-wearing detection module 21.

The digital television broadcast receiver 11 can display stereoscopic images (3D or three-dimensional images). The digital television broadcast receiver 11 is herein equipped with the stereoscopic glasses (3D glasses) so that the user recognizes stereoscopic images from the images displayed on the digital television broadcast receiver 11.

The digital television broadcast receiver 11 has a cabinet 13 and a support base 14 for supporting this cabinet 13. The liquid crystal display panel 15 serving as an image display module is disposed at the front central module of the cabinet 13. Furthermore, the speakers 16 are disposed on both sides of the cabinet 13 to reproduce stereo sound.

In addition, the operation module 17 equipped with the main power switch 17a and the light-receiving module 19 for receiving operation information transmitted from the remote controller 18 are disposed at the front lower module of the cabinet 13.

The support base 14 is turnably connected to the bottom central module of the cabinet 13 and supports the cabinet 13 so as to stand it upright while the cabinet 13 is placed on the horizontal plane of the predetermined base 20.

In the case of displaying a stereoscopic image, the digital television broadcast receiver 11 generates a right-eye image signal and a left-eye image signal and alternately displays a right-eye image and a left-eye image on the liquid crystal display panel 15.

Furthermore, the digital television broadcast receiver 11 generates a shutter control signal SC indicating a period during which the right-eye image is displayed and a period during which the left-eye image is displayed and outputs the signal to the stereoscopic glasses 12.

The stereoscopic glasses 12 are controlled so that the left-eye shutter thereof is closed when the right-eye image is displayed and so that the right-eye shutter thereof is closed when the left-eye image is displayed on the basis of the shutter control signal SC supplied from the digital television broadcast receiver 11, thereby allowing the user to recognize a stereoscopic image.

Moreover, the stereoscopic glasses 12 are equipped with the glass-wearing detection module 21 for detecting whether the user uses the stereoscopic glasses 12, that is, whether the user wears the stereoscopic glasses 12. A glass-wearing detection signal CD output from the glass-wearing detection module 21 is supplied to the digital television broadcast receiver 11.

When the glass-wearing detection signal CD indicating that the user wears the stereoscopic glasses 12 is supplied, the digital television broadcast receiver 11 alternately displays the right-eye image and the left-eye image on the liquid crystal display panel 15, thereby performing stereoscopic image display.

Figure 2:
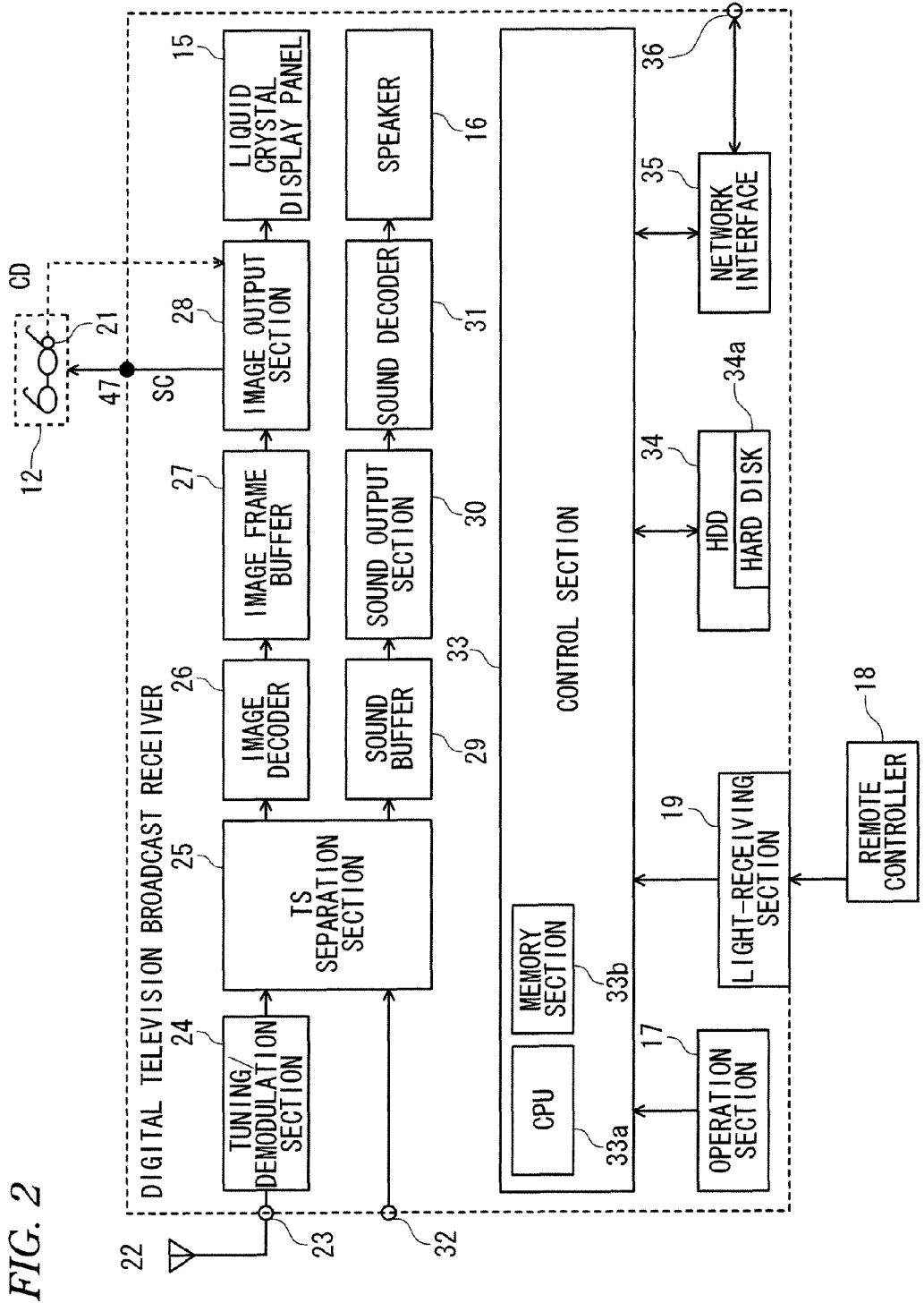
FIG. 2 is a block diagram showing a configuration of the 3D image output apparatus according to the embodiment.

FIG. 2 is a block diagram illustrating a configuration of the 3D image output apparatus according to the embodiment.

Numeral 22 designates an antenna, numeral 23 designates an input terminal, numeral 24 designates a tuning/demodulation module, numeral 25 designates a TS separation module, numeral 26 designates an image decoder, numeral 27 designates an image frame buffer, numeral 28 designates an image output module, numeral 29 designates a sound buffer, numeral 30 designates a sound output module, numeral 31 designates a sound decoder, and numeral 32 designates an input terminal.

Numeral 33 designates a control module, numeral 33a designates a CPU, numeral 33b designates a memory module, numeral 34 designates an HDD, numeral 34a designates a hard disk, numeral 35 designates a network interface, and numeral 36 designates an input/output terminal.

Digital television broadcast signals received by the antenna 22 are supplied to the tuning/demodulation module 24 via the input terminal 23. The tuning/demodulation module selects the signal of a desired channel from the input digital television broadcast signals, demodulates the selected broadcast signal, and generates and outputs a TS (transport stream).

The TS output from the tuning/demodulation module 24 is supplied to the TS separation module 25 and separated into an image component and a sound component. The image component is decoded by the image decoder 26 to its original digital image signal and stored in the image frame buffer 27.

The image signal stored in the image frame buffer 27 is read to the image output module 28 in frame unit and subjected to a predetermined signal process. The processed signal is supplied to the liquid crystal display panel 15 and used for the image display on the display panel 15.

Furthermore, the sound component separated by the TS separation module 25 is stored in the sound buffer 29, read to the sound output module 30, and subjected to a predetermined signal process. The sound component output from the sound output module 30 is decoded by the sound decoder 31 to digital sound data and then converted into analog data, whereby sound is reproduced from the speakers 16.

Furthermore, the digital television broadcast receiver 11 is equipped with the input terminal 32. A TS output from an external recording/reproducing apparatus, such as an optical disc recording/reproducing apparatus for recording/reproducing data on optical discs (for example, DVDs (digital versatile discs)) or an external HDD (hard disk drive), is supplied to the input terminal 32.

The TS input to the input terminal 32 is supplied to the TS separation module 25. Then, the TS separation module selects the TS supplied from the tuning/demodulation module 24 or the TS supplied from the input terminal 32 and operates to separate the selected TS into an image component and a sound component.

Various operations including the above-mentioned various kinds of receiving operations in the digital television broadcast receiver 11 are controlled by the control module 33.

The control module 33 incorporates a CPU (central processing unit) 33a. Furthermore, the control module 33 receives operation information from the operation module 17 and operation information transmitted from the remote controller 18 and received by the light-receiving module 19 and controls various modules so that the corresponding operations are carried out.

The control module 33 uses the memory module 33b. The memory module 33b has a ROM (read-only memory) storing control programs to be executed by the CPU 33a, a RAM (random access memory) providing working areas for the CPU 33a, and a non-volatile memory storing various kinds of setting information, control information, etc.

Moreover, the control module 33 is connected to the built-in HDD 34. On the basis of user operation, the control module 33 subjects signals such as digital image and sound signals obtained from the image decoder 26 and the sound decoder 31 to encryption or converts the formats of such signals into predetermined recording formats. The processed signals are supplied to the HDD 34 and can be recorded on the hard disk 34a.

Besides, on the basis of user operation, the control module 33 causes the HDD 34 to read the desired signals such as the desired image and sound signals from the hard disk 34a and subjects the signals to decryption. The processed signals are supplied to the image frame buffer 27 and the sound decoder 31 and can be used for image display and sound reproduction.

Still further, the control module 33 is connected to a network, such as the Internet, via the network interface 35 and the input/output terminal 36.

As a result, on the basis of user operation, the control module 33 accesses a server on the network and obtains the desired signals such as the desired image and sound signals. The obtained image and sound signals can be used for image display and sound reproduction and can be recorded on the hard disk 34a of the HDD 34.

In the case that the image signal supplied in frame unit from the image frame buffer 27 is an ordinary two-dimensional image signal, the image output module 28 subjects the image signal to frame double speed conversion so that the image signal can be displayed on the liquid crystal display panel 15 and supplies the processed signal to the liquid crystal display panel 15 to perform image display.

In the case that the image signal supplied in frame unit from the image frame buffer 27 is a stereoscopic image signal, the image output module 28 generates a right-eye image signal and a left-eye image signal from the image signal and alternately outputs the right-eye image signal and the left-eye image signal to the liquid crystal display panel 15 to perform image display.

At this time, the image output module 28 generates the shutter control signal SC indicating a period during which the right-eye image is displayed and a period during which the left-eye image is displayed and outputs the signal to the stereoscopic glasses 12 via an output terminal 47.

The stereoscopic glasses 12 are controlled so that the left-eye shutter thereof is closed when the right-eye image is displayed and so that the right-eye shutter thereof is closed when the left-eye image is displayed on the basis of the shutter control signal SC supplied from the digital television broadcast receiver 11, thereby allowing the user to recognize a stereoscopic image.

A judgment as to whether the image signal supplied in frame unit from the image frame buffer 27 is an ordinary two-dimensional image signal or a stereoscopic image signal can be made, for example, by detecting attribute information added to the image signal to be used for image display using the control module 33.

Furthermore, the stereoscopic glasses 12 are equipped with the glass-wearing detection module 21 for detecting whether the user wears the stereoscopic glasses 12. Various methods are conceived for the detection. For example, the glass-wearing detection module 21 detects whether the user wears the glasses depending on whether pressure is present, or detects whether the user wears the glasses depending on whether an emitted infrared ray is reflected by the liquid crystal display panel 15 and received, or detects whether the user wears the glasses depending on inclination.

The glass-wearing detection module 21 wirelessly transmits the glass-wearing detection signal CD, and the transmitted glass-wearing detection signal CD is received by the image output module 28.

When the image signal supplied from the image frame buffer 27 is a stereoscopic image signal and when the glass-wearing detection signal CD indicating that the user wears the stereoscopic glasses 12 is supplied, the image output module 28 generates a right-eye image signal and a left-eye image signal from the image signal and alternately displays a right-eye image and a left-eye image on the liquid crystal display panel 15 to perform stereoscopic image display.

Furthermore, when the glass-wearing detection signal CD indicating that the user does not wear the stereoscopic glasses 12 is supplied, the image output module 28 converts the received stereoscopic image signal into an ordinary two-dimensional image signal and subjects the two-dimensional image signal to frame double speed conversion so that the image signal can be displayed on the liquid crystal display panel 15 and supplies the processed signal to the liquid crystal display panel 15 to perform image display.

Figure 3:
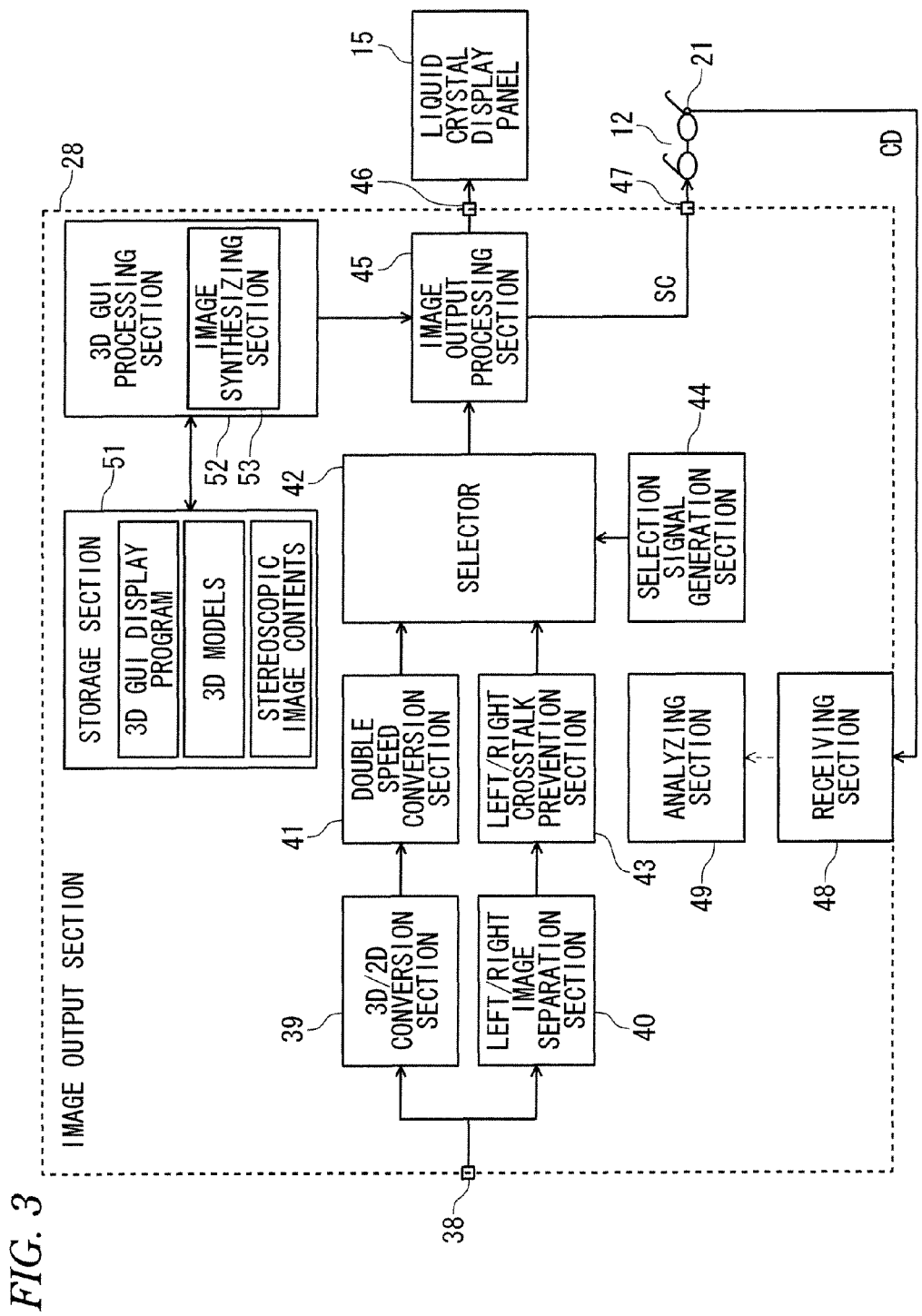
FIG. 3 is a view showing a configuration of the image output module of the 3D image output apparatus according to the embodiment.

FIG. 3 is a view showing a configuration of the image output module of the 3D image output apparatus according to the embodiment.

Numeral 38 designates an input terminal, numeral 39 designates a three-dimension/two-dimension (3D/2D) conversion module, numeral 40 designates a left/right image separation module, numeral 41 designates a double speed conversion module, numeral 42 designates a selector, numeral 43 designates a left/right crosstalk prevention module, numeral 44 designates a selection signal generation module, numeral 45 designates an image output processing module, numeral 46 designates an output terminal, numeral 47 designates an output terminal, numeral 48 designates a receiving module, and numeral 49 designates an analyzing module.

A configuration example of the above-mentioned image output module 28 is shown herein.

As described above, the image signal supplied from the image frame buffer 27 is supplied to the three-dimension/two-dimension (3D/2D) conversion module 39 and the left/right image separation module 40 via the input terminal 38.

When a two-dimensional (2D) image signal is input, the three-dimension/two-dimension conversion module 39 outputs the image signal to the double speed conversion module 41 provided in the subsequent stage.

Furthermore, when a stereoscopic image signal is input, the three-dimension/two-dimension conversion module 39 converts the image signal into a two-dimensional image signal and outputs the image signal to the double speed conversion module 41.

The double speed conversion module 41 subjects the input two-dimensional image signal to frame double speed conversion so that image display can be performed on the liquid crystal display panel 15 by using a method in which interpolation frames are formed using motion vectors between the frames, for example. The double speed conversion module 41 then outputs the processed signal to the input terminal of the selector 42.

Moreover, when a stereoscopic image signal is input, the left/right image separation module 40 separates the image signal into a right-eye image signal and a left-eye image signal and alternately outputs the image signals to the left/right crosstalk prevention module 43 at double speed.

The left/right crosstalk prevention module 43 inserts a black image signal between the right-eye image signal and the left-eye image signal input alternately to prevent interference (crosstalk) during the switching between the right-eye image and the left-eye image and then outputs the processed image signal to the input terminal of the selector 42.

The selector 42 selects the image signal supplied from the double speed conversion module 41 or the image signal supplied from the left/right crosstalk prevention module 43 on the basis of the selection signal output from the selection signal generation module 44 and outputs the selected image signal to the image output processing module 45.

The image output processing module 45 processes the input image signal so that image signal is used for image display on the liquid crystal display panel 15 and then outputs the processed signal to the liquid crystal display panel 15 via the output terminal 46.

Furthermore, in the case that the input image signal is a stereoscopic image signal, the image output processing module 45 generates the shutter control signal SC indicating a period during which the right-eye image is displayed and a period during which the left-eye image is displayed and outputs the signal to the stereoscopic glasses 12 via the output terminal 47.

The stereoscopic glasses 12 are controlled so that the left-eye shutter thereof is closed when the right-eye image is displayed and so that the right-eye shutter thereof is closed when the left-eye image is displayed on the basis of the shutter control signal SC supplied from the image output processing module 45. Hence, a stereoscopic image is recognized by the user.

Moreover, the glass-wearing detection signal CD wirelessly output from the glass-wearing detection module 21 provided for the stereoscopic glasses 12 is received by the receiving module 48 provided inside the image output module 28.

The glass-wearing detection signal CD received by the receiving module 48 is supplied to the analyzing module 49, and a judgment is made as to whether the user wears the stereoscopic glasses 12.

When it is judged that the user wears the stereoscopic glasses 12, the analyzing module 49 causes the selection signal generation module 44 to generate a selection signal for performing switching at the selector 42 so that the image signal output from the left/right crosstalk prevention module 43 is supplied to the image output processing module 45.

In addition, when it is judged that the user does not wear the stereoscopic glasses 12, the analyzing module 49 causes the selection signal generation module 44 to generate a selection signal for performing switching at the selector 42 so that the image signal output from the double speed conversion module 41 is supplied to the image output processing module 45.

In the image output module 28, when the user takes off the stereoscopic glasses 12 while a stereoscopic image signal is used to perform image display on the liquid crystal display panel 15, an image signal obtained by converting the stereoscopic image signal for two-dimensional image display is automatically supplied and used for image display on the liquid crystal display panel 15.

When the user puts on the stereoscopic glasses 12, the stereoscopic image signal is automatically used for image display on the liquid crystal display panel 15, thereby allowing the user to recognize a stereoscopic image.

Numeral 51 designates a storage module, numeral 52 designates a 3D GUI processing module (output image forming module), and numeral 53 designates an image synthesizing module. 2D represents two-dimensional (plane) display, and 3D represents three-dimensional (stereoscopic) display.

In the embodiment, a thumbnail relating to a 3D displayable image content is displayed in 3D or 2D depending on whether the thumbnail is displayed at the front or in an oblique state, as described later.

The image output module 28 is equipped with the storage module 51 and the 3D GUI processing module (output image forming module) 52.

The storage module 51 is formed of a magnetic storage device, such as an HDD, or a semiconductor memory device, such as an EPROM. A program (3D GUI display program) for displaying thumbnails relating to 3D displayable image contents as 3D GUI or 2D GUI is stored in the storage module 51. GUI is the abbreviation of graphical user interface.

Furthermore, three-dimensional models (3D models) and stereoscopic image contents are stored in the storage device 51.

The 3D GUI processing module (output image forming module) 52 has the image synthesizing module 53. The image synthesizing module 53 performs synthesis as described below to display thumbnails relating to 3D displayable image contents as 3D GUI and 2D GUI.

Figure 4:
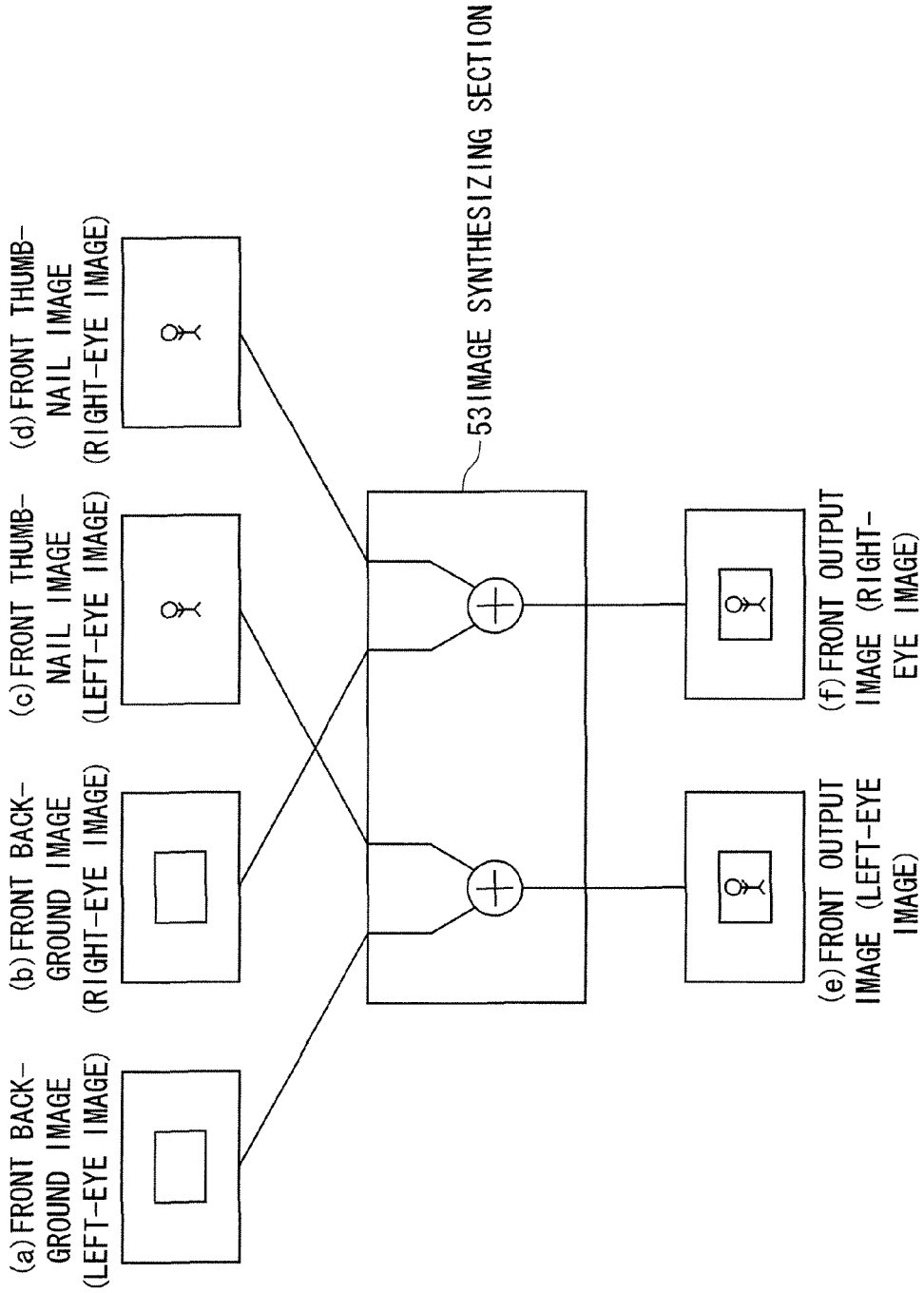
FIG. 4 is a view illustrating how a front output image in which a thumbnail image is displayed in 3D is formed in the 3D image output apparatus according to the embodiment.

FIG. 4 is a view illustrating how a front output image in which a thumbnail image is displayed in 3D is formed in the 3D image output apparatus according to the embodiment.

In the embodiment, the front output image is output and displayed to the user positioned directly in front of a TV.

Furthermore, oblique output images are images other than the image output directly in front of the TV. For example, an oblique output image is an image obtained when the front output image is turned by a predetermined angle. Alternatively, for example, a figure obtained by deforming the front output image and having a distorted circular shape and a figure obtained by deforming the front output image having a rectangular shape into a trapezoidal shape or the like, for giving a sense of perspective, are taken as examples of the oblique output images.

A 3D thumbnail image is herein formed as described below and output.

First, a left-eye background image and a right-eye background image for 3D display are formed.

Next, a left-eye thumbnail image and a right-eye thumbnail image are formed and these are attached to the left-eye background image and the right-eye background image.

The thumbnail images are mapped onto the background images by texture mapping. For example, mapping images for the thumbnail images are preliminarily formed from the above-mentioned image contents.

A thumbnail image may be a moving image or a still image. For example, a thumbnail image is a reduced-size representation of the image of an image content.

Thumbnail images are herein, for example, images displayed on a content selection screen and used by the user when the user selects image contents recorded on an HDD or image contents obtained from broadcasts. For example, thumbnails serving as the reduced-size representations of the above-mentioned plurality of image contents are used and displayed side by side.

A thumbnail output image in which a thumbnail image is attached to a background image is then output. The left-eye image and the right-eye image of the thumbnail output image for 3D display are controlled as described above and output.

A section (a) of FIG. 4 shows a left-eye front background image serving as a background image for use in outputting the left-eye output image for a front image. Furthermore, a section (b) of FIG. 4 shows a right-eye front background image serving as a background image for use in outputting the right-eye output image for the front image. These images are formed by using the 3D GUI display program, for example.

A section (c) of FIG. 4 shows a left-eye front thumbnail image serving as a thumbnail image for use in outputting the left-eye output image for the front image. Furthermore, a section (d) of FIG. 4 shows a right-eye front thumbnail image serving as a right-eye thumbnail image for use in outputting the right-eye output image for the front image. These images are formed from the above-mentioned stereoscopic image contents (3D display image contents) by using the 3D GUI display program, for example.

Numeral 53 designates the image synthesizing module. In the image synthesizing module, the left-eye front background image shown in the section (a) of FIG. 4 is synthesized with the left-eye front thumbnail image shown in the section (c) of FIG. 4, and the left-eye output image for the front image is output.

Furthermore, the right-eye front background image shown the section (b) of FIG. 4 is synthesized with the right-eye front thumbnail image shown in the section (d) of FIG. 4, and the right-eye output image for the front image is output.

A section (e) of FIG. 4 shows the left-eye output image for the front image output from the image synthesizing module 53. Furthermore, a section (f) of FIG. 4 shows the right-eye output image for the front image output from the image synthesizing module 53.

The left-eye output image for the front image and the right-eye output image for the front image are output, and the user can view the thumbnail image in 3D.

In other words, the thumbnail image is formed by the image synthesizing module 53 incorporated in the 3D GUI processing module (output image forming module) 52.

Moreover, in the case that the thumbnail is not displayed obliquely, the thumbnail image is displayed in 3D.

The section (a) of FIG. 4 shows the left-eye background image, and the section (b) of FIG. 4 shows the right-eye background image. In addition, the section (c) of FIG. 4 shows the left-eye thumbnail image, and the section (d) of FIG. 4 shows the right-eye thumbnail image. These images are input to the image synthesizing module 53.

In the case that the thumbnail image is displayed in 3D, the left-eye thumbnail image shown in the section (c) of FIG. 4 is added to the left-eye background image shown in the section (a) of FIG. 4, and the obtained image is output as the left-eye output image by the image synthesizing module 53. Furthermore, the right-eye thumbnail image shown in the section (d)

of FIG. 4 is added to the right-eye background image shown in the section (b) of FIG. 4 and the obtained image is output as the right-eye output image.

The section (e) of FIG. 4 shows the left-eye output image output from the image synthesizing module 53, and the section (f) of FIG. 4 shows the right-eye output image output from the image synthesizing module 53.

The left-eye output image (shown in the section (e) of FIG. 4) and the right-eye output image (shown in the section (f) of FIG. 4)) having the added thumbnail image and output from the image synthesizing module 53 are controlled as described above and displayed in 3D (three-dimensionally) on the digital television broadcast receiver. This 3D-displayed thumbnail image is viewed by the user wearing the 3D glasses 12, for example.

Figure 5:
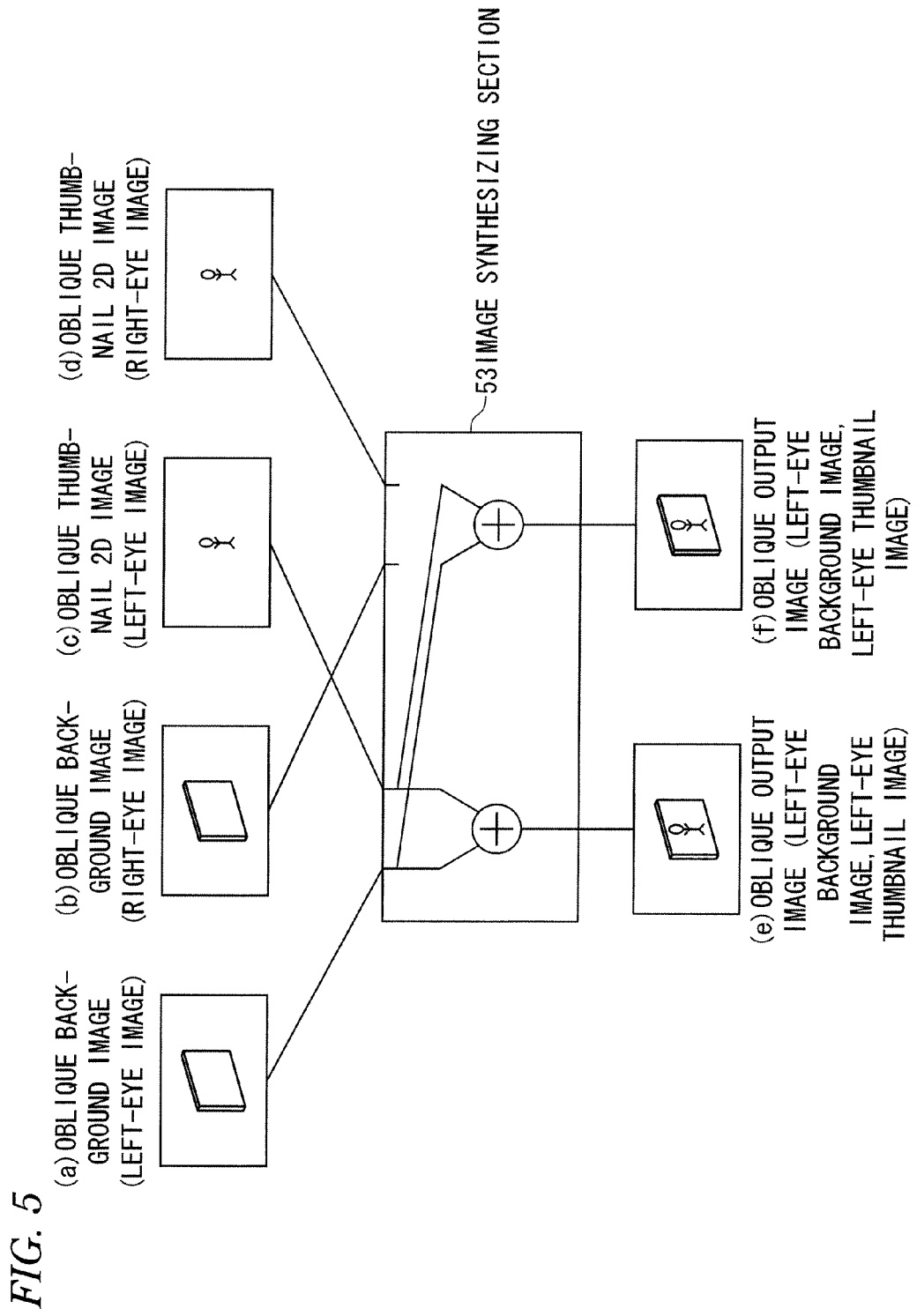
FIG. 5 is a view illustrating how an oblique output image in which a thumbnail image is displayed in 2D is formed in the 3D image output apparatus according to the embodiment.

FIG. 5 is a view illustrating how an oblique output image in which a thumbnail image is displayed in 2D is formed in the 3D image output apparatus according to the embodiment.

When the oblique output image is output and displayed in 3D, there is a possibility that the output image may be displayed at a position away from the front face of the TV.

Hence, the oblique output image is herein output and displayed in 2D.

First, a left-eye background image and a right-eye background image for 2D display are formed in a way similar to that described above. However, an identical image is used as the left-eye and right-eye background images for 2D display to reduce the uncomfortable feeling of the user. For example, the left-eye background image is herein used as the left-eye and right-eye background images.

Next, the left-eye and right-eye 2D thumbnail images are attached to the left-eye and right-eye background images (left-eye background image).

Like the above-mentioned background images, the left-eye and right-eye 2D thumbnail images are processed as described below; an identical image is used as the left-eye and right-eye thumbnail images for 2D display to reduce the uncomfortable feeling of the user. For example, the left-eye thumbnail image is herein used as the left-eye and right-eye thumbnail images.

Then, a thumbnail output image obtained by attaching the 2D thumbnail image (left-eye thumbnail image) to the 2D background image (left-eye background image) is output as both the left-eye and right-eye thumbnail output images.

Next, the thumbnail output image for 2D display is output.

The oblique turning of the oblique output image is performed as described below, for example.

First, the left-eye background image and the right-eye background image are respectively turned obliquely depending on a predetermined turning angle. The turning can be replaced with deformation or shrinkage for representing a sense of perspective as described above.

In addition, the 2D thumbnail image is subjected to texture mapping. A mapping image is herein preliminarily formed from an image content, turned depending on the predetermined turning angle and mapped to the background image.

Namely, a section (a) of FIG. 5 shows a left-eye front background image, and a section (b) of FIG. 5 shows a right-eye background image. In addition, a section (c) of FIG. 5 shows a left-eye thumbnail image, and a section (d) of FIG. 5 shows a right-eye thumbnail image. These images are input to the image synthesizing module 53.

In the case that the thumbnail image is displayed in 2D, for example, the right-eye thumbnail image shown in the section (d) of FIG. 5 is added to the left-eye background image shown in the section (a) of FIG. 5, and the obtained image is output as the left-eye output image by the image synthesizing module 53.

Furthermore, the right-eye thumbnail image shown in the section (d) of FIG. 5 is added to the right-eye background image shown in the section (b) of FIG. 5 and the obtained image is output as the right-eye output image.

A section (e) of FIG. 5 shows the left-eye output image output from the image synthesizing module 53, and a section (f) of FIG. 5 shows the right-eye output image output from the image synthesizing module 53.

In the left-eye output image (shown in the section (e) of FIG. 5) and the right-eye output image (shown in the section (f) of FIG. 5) having the added thumbnail image and output from the image synthesizing module 53, the right-eye thumbnail image is added to both the left and right output images, whereby a 2D (two-dimensional) thumbnail image is displayed.

In the above description, the right-eye thumbnail image is added to both the left and right output images to form the 2D display thumbnail image. However, instead of this method, it is possible to add the left-eye thumbnail image to both the left and right output images to form the 2D display thumbnail image.

The 2D (two-dimensional) display thumbnail image is displayed in 2D (two-dimensionally) even when the user wears the 3D glasses 12.

Figure 6:
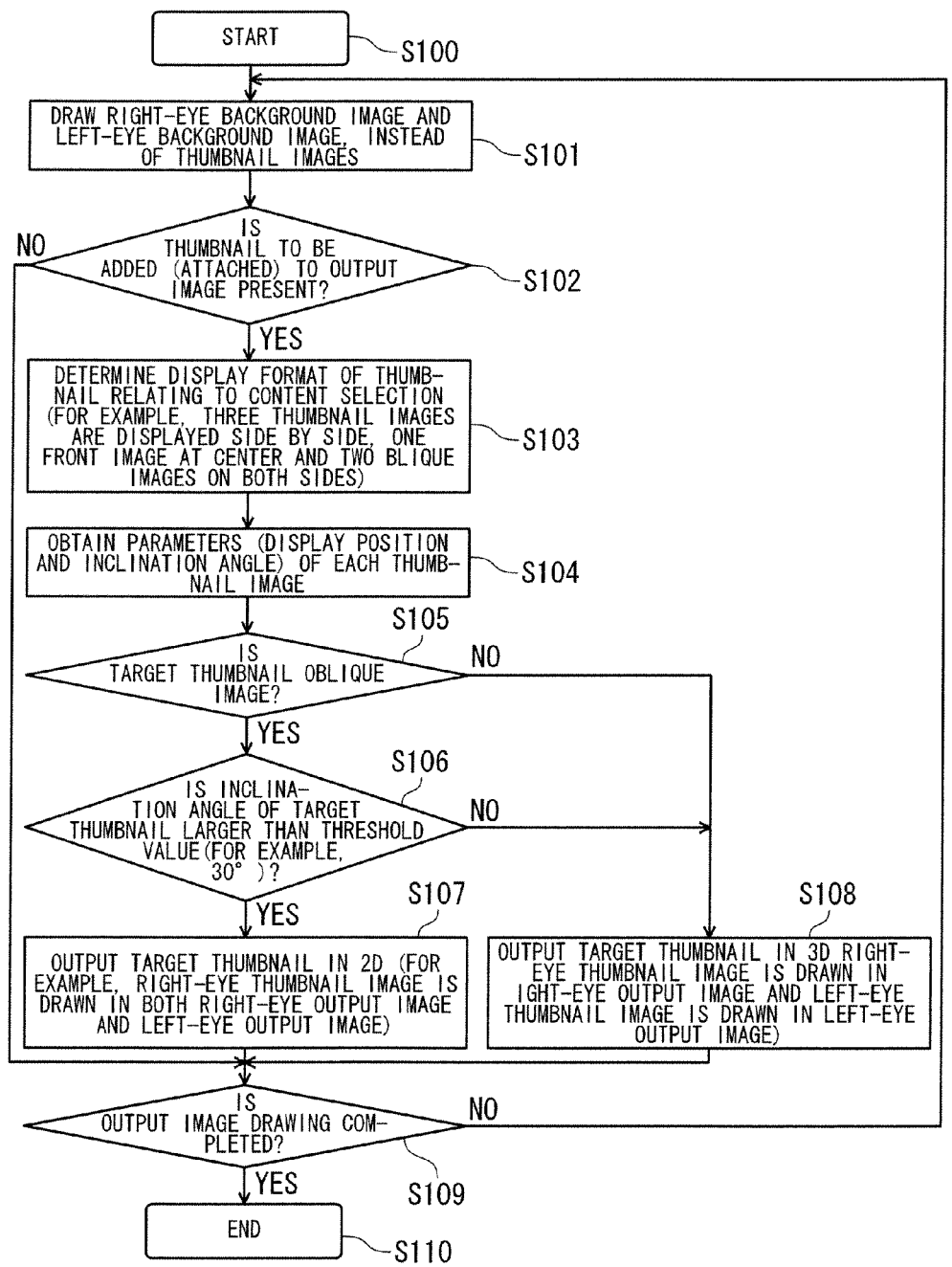
FIG. 6 is a flowchart illustrating how the oblique display of a thumbnail image is judged and how the thumbnail image is output and displayed in 3D or 2D depending on the result of the judgment in the 3D image output apparatus according to the embodiment.

FIG. 6 is a flowchart illustrating how the oblique display of the thumbnail image is judged and how the thumbnail image is output and displayed in 3D or 2D depending on the result of the judgment in the 3D image output apparatus according to the embodiment.

Step S100 is herein a start step. The procedure then advances to step S101.

At step S101, a right-eye background image and a left-eye background image, instead of thumbnail images, are drawn as described above. The procedure then advances to step S102.

At step S102, a judgment is made as to whether a thumbnail to be added (attached) to an output image is present. When it is judged that a thumbnail to be added (attached) to the output image is present, the procedure advances to step S103 (YES at step S102). When it is not judged that a thumbnail to be added (attached) to the output image is present, the procedure advances to step S109 (NO at step S102).

At step S103, the display format of the thumbnail, relating to content selection, is determined. For example, in the case that three thumbnail images are displayed side by side, one thumbnail image displayed at the center is displayed as a front image, and two thumbnail images displayed on both sides thereof are displayed as oblique images. The procedure then advances to step S104.

At step S104, the parameters (display position and inclination angle) of each thumbnail image are obtained. For example, the display position of the one thumbnail image (front image) displayed at the center of the screen, represented for example by X-axis and Y-axis coordinates on a screen, is obtained, and the inclination angle of the thumbnail image displayed obliquely is also obtained. For example, in the case of the front image, both the inclination angles thereof in the X-axis direction and the Y-axis direction are 0°.

Furthermore, similarly, the display positions of the two thumbnail images displayed on both sides, represented by X-axis and Y-axis coordinates on the screen, are obtained, and the inclination angles of the thumbnail images displayed obliquely are also obtained. The procedure then advances to step S105.

At step S105, a judgment as to whether each thumbnail image is an oblique image is made by using the parameters obtained as described above. The inclination angle is used to judge whether each thumbnail image is an oblique image. When it is judged that the thumbnail image is an oblique image, the procedure advances to step S106 (YES at step S105). When it is not judged that the thumbnail image is an oblique image, the procedure advances to step S108 (NO at step S105).

At step S106, a judgment is made as to whether the inclination angle of the thumbnail image having been judged as an oblique image is larger than a threshold value. The threshold value is herein 30°, for example. When it is judged that the inclination angle of the target thumbnail image is larger than the threshold value, the procedure advances to step S107 (YES at step S106). When it is not judged that the inclination angle of the target thumbnail image is larger than the threshold value, the procedure advances to step S108 (NO at step S106).

At step S107, the target thumbnail image is output in 2D. In the output of the thumbnail image in 2D, the right-eye thumbnail image, for example, is drawn in both the right-eye output image and the left-eye output image as described above. Furthermore, in the output of the thumbnail image in 2D, the left-eye thumbnail image may also be drawn in both the right-eye output image and the left-eye output image as described above. The procedure then advances to step S108.

At step S108, the target thumbnail image is output in 3D. At this time, the right-eye thumbnail image is added to the right-eye output image and the left-eye thumbnail image is added to the left-eye output image to perform output image drawing as described above. The procedure then advances to step S109.

At step S109, a judgment is made as to whether output image drawing is completed. When it is judged that output image drawing is completed, the procedure advances to step S110 (YES at step S109). When it is not judged that output image drawing is completed, the procedure returns to step S101 and the above-mentioned procedure is repeated (NO at step S109).

Step S110 is an end step at which the procedure ends.

In the embodiment, the GUI display mode of thumbnail images, etc. can be dynamically switched between 2D and 3D. As a result, the uncomfortable feeling in the GUI display can be reduced.

Figure 7A:
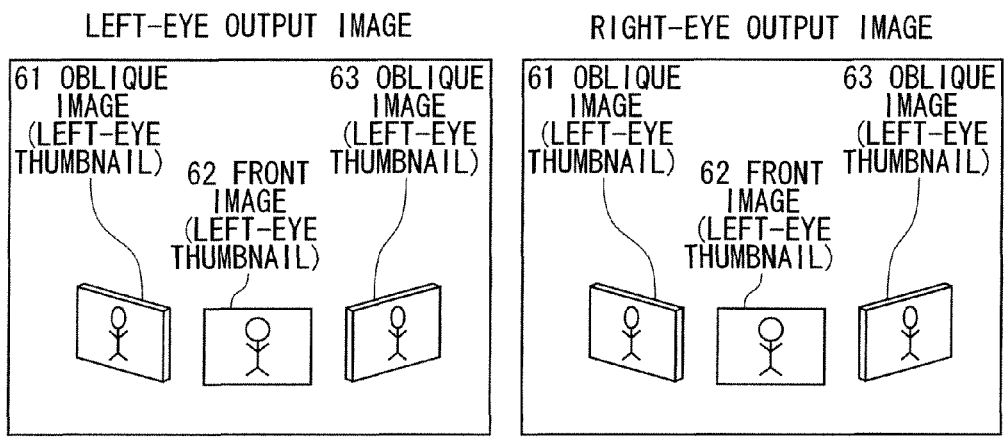
FIGS. 7A and 7B are views showing specific display examples of thumbnail images displayed on the display apparatus of the 3D image output apparatus according to the embodiment.
Figure 7B:
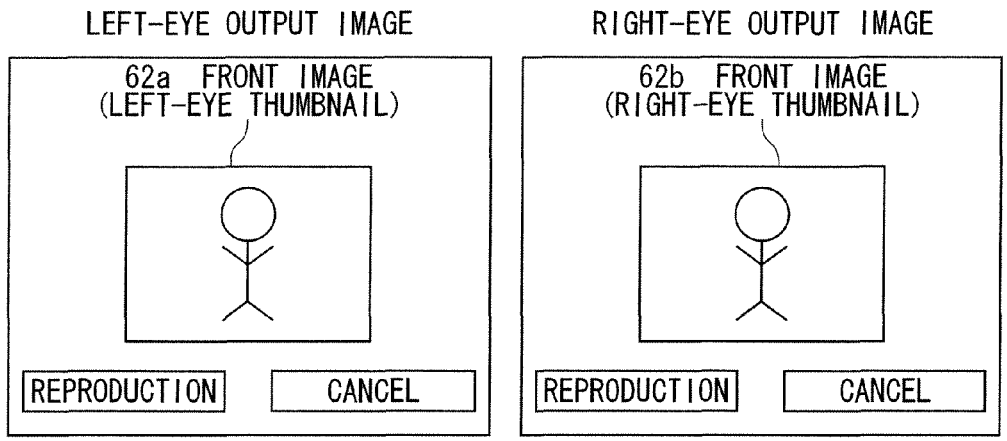

FIGS. 7A and 7B are views showing specific display examples of thumbnail images displayed on the display apparatus of the 3D image output apparatus according to the embodiment.

EXAMPLE 1

In this example, a content selection screen for content selection is displayed in 2D. When the front image is selected, a screen for instructing the reproduction of the selected content is displayed in 3D. The left output image is shown on the left side of the figure, and the right output image is shown on the right side of the figure.

FIG. 7A shows the content selection screen.

Three thumbnail images are herein displayed side by side. An oblique image 61 is displayed on the left side, a front image 62 is displayed at the center, and an oblique image 63 is displayed on the right side.

Furthermore, on the left-eye output image, the left-eye thumbnail image is displayed for the oblique image 61, the front image 62 and the oblique image 63.

Moreover, also on the right-eye output image, the left-eye thumbnail image is displayed for the oblique image 61, the front image 62 and the oblique image 63.

In other words, the content selection screen shown in FIG. 7A is displayed in 2D.

FIG. 7B is a view showing the screen for instructing the reproduction of the selected content.

The front image 62 can be displayed in 3D as described above. Hence, when the front image 62 is selected as the screen for instructing the reproduction of the selected content, the thumbnail image is displayed in 3D.

In other words, the left-eye thumbnail image is displayed for the front image 62a displayed in the left-eye output image.

Furthermore, the right-eye thumbnail image is displayed for the front image 62b displayed in the right-eye output image.

Hence, for example, the user wearing the 3D glasses 12 can instruct reproduction or cancel reproduction while viewing the 3D thumbnail image formed of the left-eye output image and the right-eye output image.

Figure 8A:
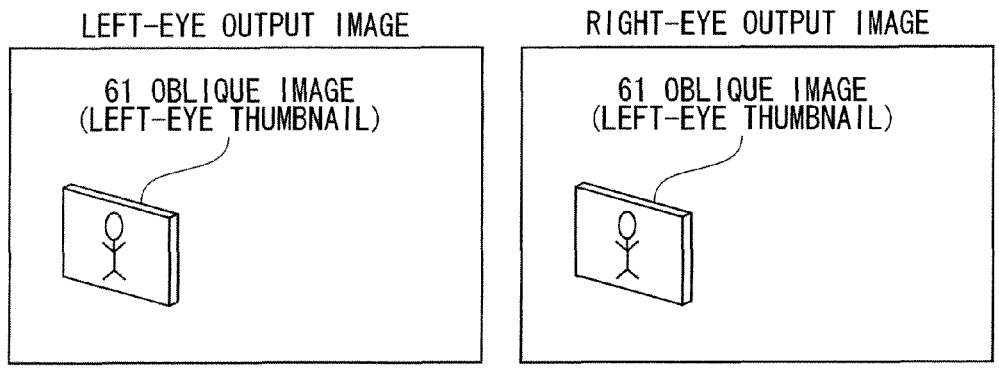
FIGS. 8A to 8C are views showing other display examples of thumbnail images displayed on the display apparatus of the 3D image output apparatus according to the embodiment.
Figure 8B:
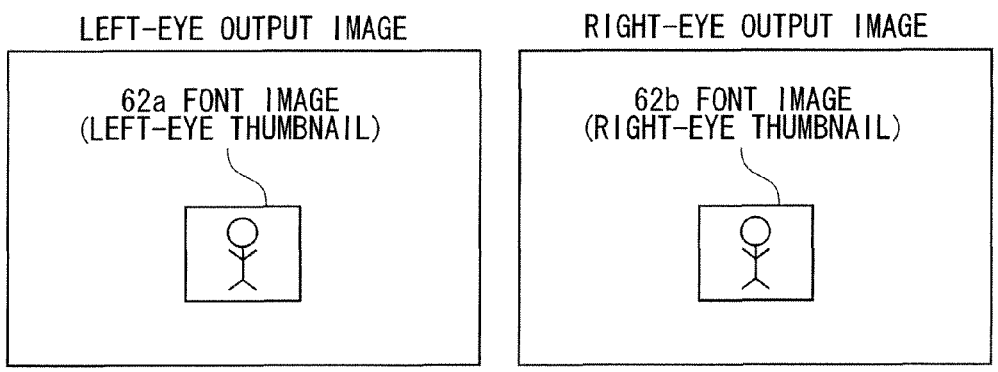
Figure 8C:
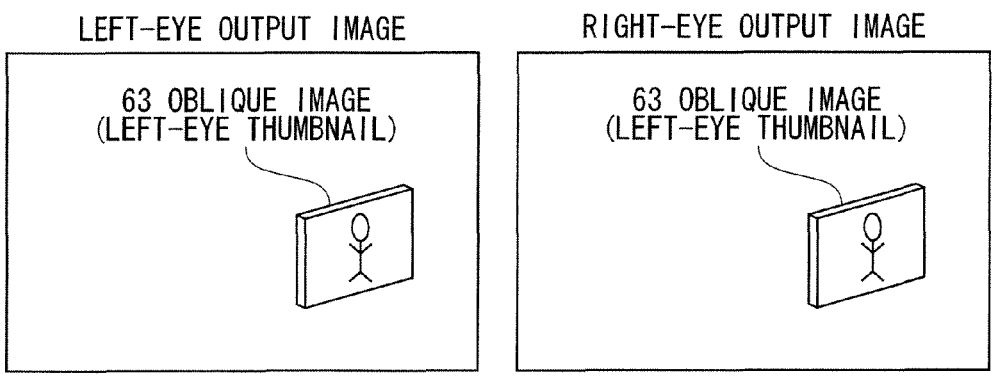

FIGS. 8A to 8C are views showing other display examples of thumbnail images displayed on the display apparatus of the 3D image output apparatus according to the embodiment.

EXAMPLE 2

In this example, the content selection screen for content selection is displayed while its display mode is switched every predetermined time, for example, every 0.5 seconds or every 1 second. The left output image is shown on the left side of the figure, and the right output image is shown on the right side of the figure.

FIG. 8A shows oblique images 61.

On the left-eye output image, the left-eye thumbnail image is displayed for the oblique image 61. Furthermore, also on the right-eye output image, the left-eye thumbnail image is displayed for the oblique image 61. The thumbnail image is herein displayed in 2D.

FIG. 8B shows front images 62a and 62b.

On the left-eye output image, the left-eye thumbnail image is displayed for the front image 62a. Furthermore, on the right-eye output image, the right-eye thumbnail image is displayed for the front image 62b. The thumbnail image is herein displayed in 3D.

FIG. 8C shows oblique images 63.

On the left-eye output image, the left-eye thumbnail image is displayed for the oblique image 63. Furthermore, also on the right-eye output image, the left-eye thumbnail image is displayed for the oblique image 63. The thumbnail image is herein displayed in 2D.

In other words, as the type of the thumbnail image is switched sequentially from an oblique image, a front image and an oblique image, the display mode of the thumbnail image is switched sequentially from 2D, 3D and 2D.

Figure 9:
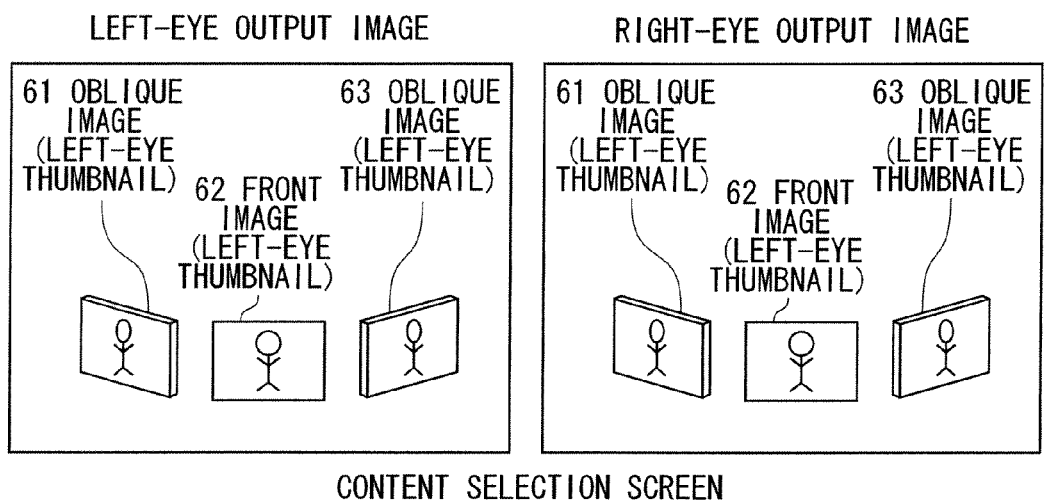
FIG. 9 is a view showing another display example of a thumbnail image displayed on the display apparatus of the 3D image output apparatus according to the embodiment.
Figure 10A:
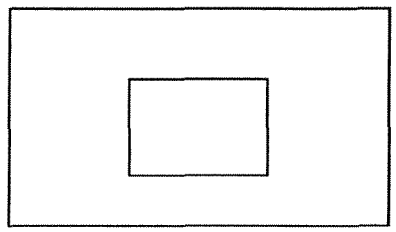
FIGS. 10A to 10F are views showing examples in which output images to which thumbnail images are added are formed in the 3D image output apparatus according to the embodiment.
Figure 10B:
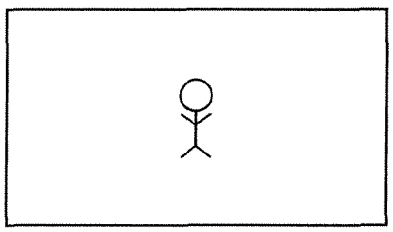
Figure 10C:
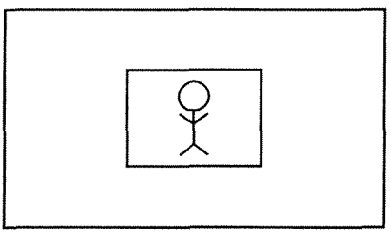
Figure 10D:
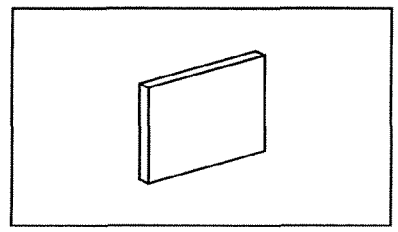
Figure 10E:
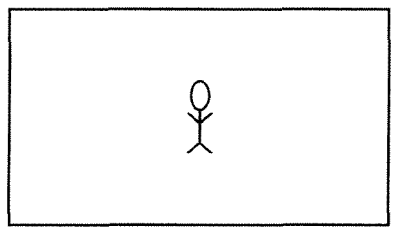
Figure 10F:
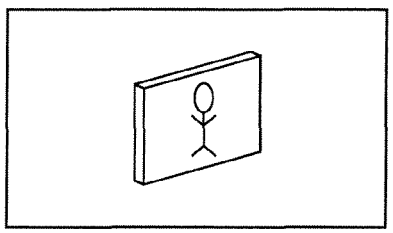

FIG. 9 is a view showing another display example of a thumbnail image displayed on the display apparatus of the 3D image output apparatus according to the embodiment. Further, FIGS. 10A to 10F are views showing examples in which output images to which thumbnail images are added are formed in the 3D image output apparatus according to the embodiment.

EXAMPLE 3

In this example, in the content selection screen for content selection, thumbnail images displayed in 2D and a thumbnail image displayed in 3D are mixedly present.

In other words, a front image 62 is displayed in 3D, and an oblique image 61 and an oblique image 63 are displayed in 2D.

Furthermore, on the left-eye output image, the left-eye thumbnail image is displayed for the oblique image 61, the front image 62 and the oblique image 63.

Moreover, on the right-eye output image, the left-eye thumbnail image is displayed for the oblique image 61, the right-eye thumbnail image is displayed for the front image 62, and the left-eye thumbnail image is displayed for the oblique image 63.

With the above-mentioned configuration, the 3D image display apparatus according to the embodiment of the present invention can reduce the uncomfortable feeling of the user when a thumbnail relating to an image content is displayed in 3D.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A three-dimensional image output apparatus comprising:
    a processor configured to judge whether a thumbnail, which is a reduced size representation of an image content that can be displayed in three-dimensions (3D) and which is displayed in a partial area of a screen, is displayed as an oblique image that is turned obliquely by at least a first angle from a front image; and
    a display controller configured to:
        output an image signal relating to the thumbnail so that the thumbnail is displayed in two-dimensions (2D) when the processor judges that the thumbnail is displayed as the oblique image, and
        output an image signal relating to the thumbnail so that the thumbnail is displayed in 3D when the processor judges that the thumbnail is not displayed as the oblique image,
    wherein as a type of the thumbnail switches sequentially from the oblique image, the front image and the oblique image, the display controller is configured to switch the thumbnail from being displayed as a 2D representation, a 3D representation and the 2D representation.

2. The three-dimensional image output apparatus according to claim 1, wherein
    the processor judges whether the thumbnail is displayed as the oblique image based on a display angle of the thumbnail relating to an image content that can be displayed in 3D.

3. The three-dimensional image output apparatus according to claim 2, wherein
    the display angle of the thumbnail is compared with the first angle being a reference value.

4. The three-dimensional image output apparatus according to claim 3, wherein:
    the reference value is an angle of at least thirty degrees (30°); and
    the processor judges that the thumbnail is displayed as the oblique image when the display angle of the thumbnail is larger than the reference value.

5. The three-dimensional image output apparatus according to claim 1, wherein
    the image signal for displaying the thumbnail in 3D comprises:
        a right-eye output signal to which a right-eye thumbnail image formed from the image content is added; and
        a left-eye output signal to which a left-eye thumbnail image formed from the image content is added.

6. The three-dimensional image output apparatus according to claim 1, wherein
    the image signal for displaying the thumbnail in 2D comprises:
        a right-eye output signal to which a right-eye thumbnail image formed from the image content is added; and
        a left-eye output signal to which a right-eye thumbnail image formed from the image content is added.

7. The three-dimensional image output apparatus according to claim 1, wherein
    the image signal for displaying the thumbnail in 2D comprises:
        a right-eye output signal to which a left-eye thumbnail image formed from the image content is added; and
        a left-eye output signal to which a left-eye thumbnail image formed from the image content is added.

8. A three-dimensional image display apparatus comprising:
    a processor configured to judge whether a thumbnail, which is a reduced size representation of an image content that can be displayed in three-dimensions (3D) and which is displayed in a partial area of a screen, is displayed as an oblique image that is turned obliquely by at least a first angle from a front image;
    a display controller configured to:
        output an image signal relating to a thumbnail so that the thumbnail is displayed in two-dimensions (2D) when the processor judges that the thumbnail is displayed as the oblique image, and
        output an image signal relating to the thumbnail so that the thumbnail is displayed in 3D when the processor judges that the thumbnail is not displayed as the oblique image, and
        as a type of the thumbnail for display switches sequentially from the oblique image, the front image and the oblique image, the image signal is configured for output for display in 2D, display in 3D and display in 2D; and
    an image display module configured to:
        receive the output image signal, and
        displaying the thumbnail.

9. A three-dimensional image output method comprising the step of:
    judging whether a thumbnail, which is a reduced size representation of an image content that can be displayed in three-dimensions (3D) and which is displayed in a partial area of a screen, is displayed as an oblique image that is turned obliquely by a first angle from a front image by a first processor; and
    outputting an image signal relating to a thumbnail by a second processor so that the thumbnail is displayed in two-dimensions (2D) in a case that the first processor judges that the thumbnail is displayed as the oblique image and outputting an image signal relating to the thumbnail by the second processor so that the thumbnail is displayed in 3D in a case that the first processor judges that the thumbnail is not displayed as the oblique image,
    wherein the outputting of the image signal relating to the thumbnail by the second processor comprises (i) outputting the image signal relating to the thumbnail by the second processor so that the thumbnail is displayed in 2D when the first processor judges that the thumbnail is displayed as the oblique image, (ii) outputting the image signal relating to the thumbnail by the second processor so that the thumbnail is displayed in 3D when the first processor judges that the thumbnail is displayed as the front image, and (iii) outputting the image signal relating to the thumbnail by the second processor so that the thumbnail is displayed in 2D when the first processor judges that the thumbnail is displayed as the oblique image.

10. The three-dimensional image output apparatus according to claim 1, wherein the image signal output module to display the thumbnail as a 3D image or as a 2D image based on an orientation of the thumbnail itself.

11. The three-dimensional image display apparatus according to claim 8, wherein the image signal output module to display the thumbnail as a 3D image or as a 2D image based on an orientation of the thumbnail itself.

12. The three-dimensional image output method according to claim 9, wherein the outputting of the image signal to cause the thumbnail to be displayed as a 3D image or as a 2D image based on an orientation of the thumbnail itself.

13. The three-dimensional image output apparatus according to claim 1, wherein the thumbnail is displayed as the oblique image when an inclination angle of the thumbnail from the front image is at least the first angle being greater than a threshold level in degrees.

14. The three-dimensional image output apparatus according to claim 13, wherein the threshold level in degrees from the front image is equal to thirty degrees.

15. The three-dimensional image display apparatus according to claim 8, wherein the thumbnail is displayed as the oblique image when an inclination angle of the thumbnail from the front image is at least the first angle being greater than a threshold level in degrees.

16. The three-dimensional image display apparatus according to claim 15, wherein the threshold level in degrees from the front image is equal to thirty degrees.

17. The three-dimensional image output method according to claim 9, wherein the thumbnail is displayed as the oblique image when an inclination angle of the thumbnail from the front image is at least the first angle being greater than a threshold level in degrees.

18. The three-dimensional image display method according to claim 17, wherein the threshold level in degrees from the front image is equal to thirty degrees.

* * * * *